(12) United States Patent
Si et al.

(10) Patent No.: US 11,184,154 B2
(45) Date of Patent: *Nov. 23, 2021

(54) METHOD FOR SEQUENTIALLY ENCRYPTING AND DECRYPTING DOUBLY LINKED LISTS BASED ON DOUBLE KEY STREAM CIPHERS

(71) Applicants: Zhuhai College of Jilin University, Guangdong (CN); Jilin University, Jilin (CN)

(72) Inventors: Yujuan Si, Guangdong (CN); Liuqi Lang, Guangdong (CN)

(73) Assignees: Zhuhai College of Jilin University, Guangdong (CN); Jilin University, Jilin (CN)

( * ) Notice: Subject to any disclaimer, the term of this patent is extended or adjusted under 35 U.S.C. 154(b) by 72 days.

This patent is subject to a terminal disclaimer.

(21) Appl. No.: 16/461,162

(22) PCT Filed: Jun. 29, 2018

(86) PCT No.: PCT/CN2018/093661
§ 371 (c)(1),
(2) Date: May 15, 2019

(87) PCT Pub. No.: WO2019/214025
PCT Pub. Date: Nov. 14, 2019

(65) Prior Publication Data
US 2020/0213080 A1    Jul. 2, 2020

(30) Foreign Application Priority Data
May 11, 2018  (CN) .......................... 201810449252.0

(51) Int. Cl.
*H04L 9/06* (2006.01)
*H04L 9/00* (2006.01)
*H04L 9/14* (2006.01)

(52) U.S. Cl.
CPC .............. *H04L 9/065* (2013.01); *H04L 9/001* (2013.01); *H04L 9/0631* (2013.01); *H04L 9/14* (2013.01)

(58) Field of Classification Search
CPC ....... H04L 9/065; H04L 9/001; H04L 9/0631; H04L 9/14
See application file for complete search history.

(56) References Cited

U.S. PATENT DOCUMENTS 5,365,589 A * 11/1994 Gutowitz ................ H04L 9/001
                                                        380/263
5,600,720 A *  2/1997 Iwamura ............... H04L 9/0668
                                                        380/1

(Continued)

FOREIGN PATENT DOCUMENTS

CN     103595523 A    2/2014
CN     105959118 A    9/2016

(Continued)

*Primary Examiner* — Aravind K Moorthy
(74) *Attorney, Agent, or Firm* — Kelly & Kelley, LLP (57) ABSTRACT

A method for sequentially encrypting and decrypting doubly linked lists based on double key stream ciphers comprises: establishing a plaintext set M according to a plaintext file; using the plaintext set M as an initial value and performing iterative decryption to obtain a ciphertext set C, wherein a key set P and an algorithm set A are used during the iterative decryption; for the ciphertext set C, performing multiple decryptions by calling the key set P and keys in the key set P, wherein a key set P and an algorithm set A are used during the decryptions; and, converting the obtained result of decryption into a plaintext file.

17 Claims, 5 Drawing Sheets

(56) References Cited

U.S. PATENT DOCUMENTS

| | | | |
|---|---|---|---|
| 5,734,823 A * | 3/1998 | Saigh | G06F 15/0283 709/217 |
| 5,825,878 A * | 10/1998 | Takahashi | G06F 21/79 713/190 |
| 6,064,738 A * | 5/2000 | Fridrich | H04L 9/001 380/243 |
| 6,088,449 A * | 7/2000 | Atalla | H04L 9/0838 380/273 |
| 6,633,877 B1 * | 10/2003 | Saigh | G06F 15/0283 |
| 6,845,159 B1 * | 1/2005 | Dornstedt | H04L 9/0618 380/264 |
| 7,415,109 B2 | 8/2008 | Rose et al. | |
| 7,549,058 B1 * | 6/2009 | Wang | H04N 7/1675 380/217 |
| 7,685,430 B1 * | 3/2010 | Masurkar | G06F 21/31 713/182 |
| 8,126,139 B2 | 2/2012 | Rose et al. | |
| 8,605,894 B2 * | 12/2013 | Farrugia | H04L 9/0631 380/29 |
| 9,313,023 B1 * | 4/2016 | Murray | H04L 9/0618 |
| 9,325,498 B2 * | 4/2016 | Dixon | H04L 9/0631 |
| 9,336,160 B2 * | 5/2016 | Hawkes | G06F 12/1408 |
| 10,187,200 B1 * | 1/2019 | Firestone | H04L 9/0869 |
| 10,348,704 B2 * | 7/2019 | Figueira | H04L 63/061 |
| 2001/0031050 A1 * | 10/2001 | Dornstedt | H04L 9/0861 380/44 |
| 2002/0016918 A1 * | 2/2002 | Tucker | G06F 21/14 713/190 |
| 2002/0136400 A1 * | 9/2002 | Askerov | H04L 9/065 380/28 |
| 2002/0154769 A1 * | 10/2002 | Petersen | G06F 7/586 380/42 |
| 2003/0076959 A1 * | 4/2003 | Chui | H04K 1/00 380/277 |
| 2003/0081792 A1 * | 5/2003 | Nakano | H04L 9/0891 380/286 |
| 2003/0188182 A1 * | 10/2003 | Sato | H04N 21/4405 713/193 |
| 2004/0039908 A1 | 2/2004 | Rose et al. | |
| 2004/0086117 A1 * | 5/2004 | Petersen | H04L 9/001 380/44 |
| 2005/0213756 A1 * | 9/2005 | Hubert | H04L 9/0631 380/44 |
| 2006/0072746 A1 * | 4/2006 | Tadepalli | H04L 9/0631 380/37 |
| 2006/0227965 A1 * | 10/2006 | Zhu | H04L 9/0637 380/37 |
| 2007/0014395 A1 * | 1/2007 | Joshi | H04L 9/004 380/28 |
| 2007/0116285 A1 * | 5/2007 | Nakai | H04L 9/0891 380/255 |
| 2007/0176744 A1 * | 8/2007 | Park | G06Q 20/341 340/10.1 |
| 2007/0195951 A1 * | 8/2007 | Leung, Jr. | H04L 9/0618 380/37 |
| 2007/0280474 A1 * | 12/2007 | Heinz | H04L 9/0833 380/28 |
| 2008/0063207 A1 * | 3/2008 | Borza | H04L 9/0894 380/277 |
| 2009/0154693 A1 * | 6/2009 | Nakamura | H04L 9/06 380/30 |
| 2009/0327751 A1 * | 12/2009 | Koifman | G06F 3/0665 713/189 |
| 2010/0002870 A1 | 1/2010 | Rose et al. | |
| 2010/0023748 A1 * | 1/2010 | Tang | H04L 9/065 713/150 |
| 2010/0034383 A1 * | 2/2010 | Turk | H04L 9/12 380/262 |
| 2010/0202608 A1 * | 8/2010 | Furuhashi | H04L 9/0894 380/44 |
| 2011/0069834 A1 * | 3/2011 | Urbanik | H04L 9/0618 380/28 |
| 2011/0271121 A1 * | 11/2011 | Imamoto | G11B 20/0021 713/193 |
| 2012/0128153 A1 * | 5/2012 | Golic | H04L 9/065 380/45 |
| 2012/0151222 A1 * | 6/2012 | Koifman | G06F 16/1727 713/189 |
| 2012/0170739 A1 * | 7/2012 | Karroumi | H04L 9/002 380/28 |
| 2012/0284504 A1 * | 11/2012 | Volkovs | H04L 9/065 713/150 |
| 2013/0202109 A1 * | 8/2013 | Ducharme | H04N 21/23476 380/200 |
| 2014/0185798 A1 * | 7/2014 | Feliciano | H04L 9/0863 380/44 |
| 2014/0281481 A1 * | 9/2014 | Moroney | H04L 63/0457 713/151 |
| 2014/0282907 A1 * | 9/2014 | Ignatchenko | H04L 9/3234 726/4 |
| 2014/0348323 A1 * | 11/2014 | Chevallier-Mames | H04L 9/0631 380/28 |
| 2015/0117641 A1 * | 4/2015 | Fuente | H04L 9/0822 380/44 |
| 2015/0124961 A1 * | 5/2015 | Lambert | H04L 9/0861 380/44 |
| 2016/0026468 A1 * | 1/2016 | Gueron | H04L 9/0631 713/190 |
| 2016/0104010 A1 * | 4/2016 | Henry | H04L 9/0861 713/190 |
| 2016/0196437 A1 * | 7/2016 | Wang | G06F 21/31 713/189 |
| 2016/0218860 A1 * | 7/2016 | Murray | H04L 9/065 |
| 2016/0241387 A1 * | 8/2016 | Fascenda | H04L 9/0631 |
| 2016/0359618 A1 * | 12/2016 | Kindarji | H04L 9/0631 |
| 2017/0048059 A1 * | 2/2017 | Murray | H04L 9/065 |
| 2017/0195117 A1 * | 7/2017 | Wu | H04L 9/14 |
| 2017/0237715 A1 * | 8/2017 | Karkkainen | H04L 9/0637 713/153 |
| 2017/0288855 A1 * | 10/2017 | Kumar | H04L 9/0662 |
| 2017/0365191 A1 * | 12/2017 | Malka | G09C 1/00 |
| 2018/0046753 A1 * | 2/2018 | Carrillo De La Shelton | G16B 50/10 |
| 2018/0069699 A1 * | 3/2018 | Bowman | H04L 9/0841 |
| 2018/0109508 A1 * | 4/2018 | Wall | H04L 9/0822 |
| 2018/0145838 A1 * | 5/2018 | Wang | H04L 9/0866 |
| 2018/0183576 A1 * | 6/2018 | Wang | G06F 7/588 |
| 2018/0373848 A1 * | 12/2018 | Lafortune | G06F 21/125 |
| 2019/0097798 A1 * | 3/2019 | Hunt | H04L 9/0891 |
| 2020/0295929 A1 * | 9/2020 | Kim | H04L 9/3247 |
| 2020/0412522 A1 * | 12/2020 | Si | H04L 9/001 |
| 2021/0160048 A1 * | 5/2021 | Blatt | H04L 9/008 |

FOREIGN PATENT DOCUMENTS

| | | |
|---|---|---|
| CN | 103595523 B | 2/2017 |
| CN | 106953875 A | 7/2017 |
| CN | 108777611 A | 11/2018 |
| WO | 2018/196634 A1 | 11/2018 |

* cited by examiner

| encryption mode | first encryption | | state | second encryption | | state | final state |
|---|---|---|---|---|---|---|---|
| | p even | r even | failed | p even | r even | failed | 0 |
| | p even | r even | failed | p even | r odd | successful | 0 |
| | p even | r even | failed | p odd | r even | successful | 0 |
| | p even | r even | failed | p odd | r odd | failed | 0 |
| | p even | r odd | successful | p even | r even | failed | 0 |
| 1 | p even | r odd | successful | p even | r odd | successful | 1 |
| 2 | p even | r odd | successful | p odd | r even | successful | 1 |
| | p even | r odd | successful | p odd | r odd | failed | 0 |
| | p odd | r even | successful | p even | r even | failed | 0 |
| 3 | p odd | r even | successful | p even | r odd | successful | 1 |
| 4 | p odd | r even | successful | p odd | r even | successful | 1 |
| | p odd | r even | successful | p odd | r odd | failed | 0 |
| | p odd | r odd | failed | p even | r even | failed | 0 |
| | p odd | r odd | failed | p even | r odd | successful | 0 |
| | p odd | r odd | failed | p odd | r even | successful | 0 |
| | p odd | r odd | failed | p odd | r odd | failed | 0 |
| | | | | | | | 4 |

Fig.6

METHOD FOR SEQUENTIALLY ENCRYPTING AND DECRYPTING DOUBLY LINKED LISTS BASED ON DOUBLE KEY STREAM CIPHERS

FIELD

The disclosure relates to a method for sequentially encrypting and decrypting doubly linked lists based on double key stream ciphers, and belongs to the technical field of information security.

BACKGROUND

Encryption of network communication information, encryption of aerospace digital remote control commands and data, encryption of digital remote communication data of unmanned aerial vehicles, encryption of digital communication command system information of airborne early warning aircrafts, encryption of digital communication data of GPS satellites, encryption of mobile phone communication, encryption of e-mails, encryption of electronic finance data transmission and the like have been widely used. In terms of image encoding, images in various formats can be encrypted to protect the intellectual property of images. After military, political and diplomatic files are encrypted, these files can be transmitted by a civil communication network, so that the cost of file transfer is saved.

Since the Snowden event, all countries have stepped up research and development on their own information security. The reason why the United States can acquire information contents of other countries is mainly in the following several aspects.

First, the United States has the technological advantages of the communication technology and the right of super-user management of the Internet.

Second, mail servers (the relevant departments in the United States force service providers of the mail servers to provide mail information), information passing through routers (the relevant departments in the United States force communication service departments and communication equipment suppliers to provide information interception functions), information of mobile phone communication and the like can be intercepted by other persons.

Third, lots of information is transmitted as unencrypted plain code information in the Internet. Thus, it is easier for other persons to acquire information (e.g., the leak of love letters and emails from the U. S. commander in Afghanistan).

Fourth, the United States has invested enormous material resources, human resources and financial resources. A large team for collecting, analyzing, screening and processing network information is organized. Information about other countries is collected (e.g., the interception event of German Chancellor Angela Merkel's mobile phone communication information).

Stream ciphers are also referred to as sequence ciphers. In the existing research state of stream ciphers, the analysis and design of stream ciphers are often used for military and diplomatic communications in a country. Therefore, the development and design of stream ciphers are basically carried out in a confidential state, and scholars and experts who research stream ciphers in each country have almost no published treatises in this respect. In each country, the stream cipher technology and products are restrained in export as military products. Due to their many advantages incomparable to other ciphers, the stream ciphers have become one of the most common cryptographic systems today.

The current research for the stream cryptography are based on mathematical models, and the encryption and decryption of stream ciphers are realized by complicated algebraic operations, Boolean algebraic operations, pseudo-random numbers, shift registers, linear feedback and the like. Some successful methods in this respect include A5 method, S-box method, RC4 method, K2 method and the like. These methods are not public. After years of research, some mature means for encryption and decryption have been established. At present, many scholars have searched the attack and decipherment of the ciphertext encrypted by the above methods. Consequently, the security of the ciphertext encrypted by the above methods faces a great challenge.

At present, the stream ciphers are mainly designed by methods based on the system theory, and the key stream sequences are mainly generated by generation of pseudo-random sequences with a linear feedback shift register. A method for generating pseudorandom sequences comprises: feedbacking a sequence of a shift register; generating a feedforward sequence by a linear shift register and a non-linear feedforward function; generating a clock-controlled sequence; combining network sequences; carrying the shift resister; using a cellular automaton; using a chaos theory; and the like.

SUMMARY

In view of the deficiencies of the prior art, the technical solutions of the disclosure provide a method for sequentially encrypting and decrypting doubly linked lists based on double key stream ciphers. The used chaotic stream is different from the chaotic steams in the past. The chaotic steam provided in the disclosure may be in any file mode, but is not a chaotic stream generated by a function or signal generator, so that this chaotic stream may be referred to as a true random sequence rather than a dynamically parasitic method of a pseudorandom sequence. Even if this method is guessed, since the chaotic stream is an unordered sequence, it is almost impossible to realize decipherment. Even If an exhaustion method is used, it is almost impossible to implement mathematically. Moreover, since the number of exhaustion times is the second power of 8 times of the number of bytes (N) of the plaintext, i.e., $2^{8n}$, it is also almost impossible to implement by a computer.

The technical solutions of the disclosure provide a method for sequentially encrypting and decrypting doubly linked lists based on double key stream ciphers, including: establishing a plaintext set M according to a plaintext file, wherein the plaintext can be any resolvable file; using the plaintext set M as an initial set and performing sequentially iterative encryption to obtain a ciphertext set C, wherein a reference string, a key set P and an algorithm set A are used jointly in the iterative encryption, and the reference string has $2^m$ bytes, where m>=0 and m is a positive integer; the iterative encryption includes: acquiring any values of the plaintext set M, the ciphertext set C and the key set P as initial values and pointers corresponding to the initial values, performing two iterative encryptions on the plaintext set M through the pointers, the reference string and the algorithm set A to obtain a ciphertext set C, wherein the plaintext set M and the key set P are not even numbers or odd numbers simultaneously as for a pointer used for encryption; and, for the ciphertext set C, performing multiple decryptions by calling the key set P, wherein the key set P and the algorithm set A are used during the encryption, wherein the key set P and the algorithm set A are shared by the encryption and the decryption, and the sets M and C are doubly circular linked lists; wherein the decryption includes: retrieving the iteratively encrypted initial values, establishing pointers corresponding to the initial values, performing two decryptions on the ciphertext set C in combination with the reference string and an encryption algorithm in the algorithm set A to obtain a plaintext set M, and converting the plaintext set M into a plaintext file.

In accordance with the double-linked-list sequential encryption/decryption method based on double key stream ciphers, all the plaintext set M, the ciphertext set C, the key set P and the algorithm set A are character sets consisting of binary code elements.

In accordance with the method for sequentially encrypting and decrypting doubly linked lists based on double key stream ciphers, establishing a plaintext set M according to a plaintext file includes: reading a plaintext file to obtain the number of bytes n of the plaintext file; and, establishing a plaintext set M that is an ordered set, wherein $M=\{x_0 x_1 \hat{} x_{8n-1}\}$, where $x_i=\{0,1\}$, and i satisfies the condition of $0<=i<=8n-1$, and as a doubly circular linked list, for the set M, $x_{n-1}$ is followed by $x_0$.

In accordance with the method for sequentially encrypting and decrypting doubly linked lists based on double key stream ciphers, the method further includes: the key set P includes a first key subset and a second key subset, wherein the first key subset is $P_0=\{y0_0 y0_1 \hat{} y0_{8n-1}\}$, where $y0_{j0}=\{0,1\}$, j0 satisfies the condition of $0<=j0<=8n-1$, and $P_0$ is an ordered set; the second key subset is $P_1=\{y1_0 y1_1 \hat{} y1_{8n-1}\}$, $y1_{j1}=\{0,1\}$, where $j1(0<=j1<=8n-1)$, j1 satisfies the condition of $0<=j1<=8n-1$, and $P_1$ is an ordered set; the first key subset $P_0$ and the second key subset $P_1$ are singly circular linked lists; for $P_0$, $y0_{8n-1}$ is followed by $y0_0$; and for $P_1$, $y1_{8n-1}$ is followed by $y1_0$.

In accordance with the method for sequentially encrypting and decrypting doubly linked lists based on double key stream ciphers, the method further includes: the ciphertext set C includes a first ciphertext subset and a second ciphertext subset, wherein the first ciphertext subset is $C_0=\{z0_0 z0_1 \hat{} z0_{8n-1}\}$, where $y0_{k0}=\{0,1\}$, k0 satisfies the condition of $0<=k0<=8n-1$, and $C_0$ is an ordered set; the second key subset is $C_1=\{z1_0 z1_1 \hat{} z1_{8n-1}\}$, where $z1_{k1}=\{0,1\}$, k1 satisfies the condition of $0<=k1<=8n-1$, and $C_1$ is an ordered set; the first key $C_0$ and the second key are doubly circular linked lists; for $C_0$, $z0_{8n-1}$ is followed by $z0_0$; and for $C_1$, $z1_{8n-1}$ is followed by $z1_0$.

In accordance with the method for sequentially encrypting and decrypting doubly linked lists based on double key stream ciphers, the method further includes: using any initial value $i_0$ (where $0<=i_0<=8n-1$) as an initial value of the set M, and reserving this initial value; using any initial value $i_1$ (where $0<=i_1<=8n-1$) as an initial value of the set $C_0$, and reserving this initial value; using any initial value $j_0$ (where $0<=j_0<=8n-1$) as an initial value of the set $P_0$, and reserving this initial value; using any initial value $j_1$ (where $0<=j_1<=8n-1$) as an initial value of the set $P_1$, and reserving this initial value; using any initial value $k_0$ (where $0<=k_0<=8n-1$) as an initial value of the set $C_0$, and reserving this initial value; and, using any initial value $k_1$ (where $0<=k1<=8n-1$) as an initial value of the set $C_1$, and reserving this initial value.

In accordance with the method for sequentially encrypting and decrypting doubly linked lists based on double key stream ciphers, the method further includes: the encryption step of using the plaintext set M as an initial value and performing iterative encryption to obtain a ciphertext set C includes four failed encryption methods, eight half-encryption methods and four double-key encryption methods, all the failed encryption methods and the half-encryption methods are discarded, and the four double-key encryption method are executed, wherein the four double-key encryption methods include sequentially encrypting according to a pointer of a circular linked list.

In accordance with the method for sequentially encrypting and decrypting doubly linked lists based on double key stream ciphers, the double-key encryption methods further include: a first encryption method, including a first encryption step and a second encryption step, wherein the first encryption step includes: establishing a pointer p1 to point to an $x_{i0}$ bit of the plaintext set M, and setting p1 as 8n−1 when p1 is 0; establishing a pointer p2 to point to an $x_{i0}+1$ bit of the plaintext set M, and setting p2 as 0 when p2 is 8n−1; establishing a pointer q to point to a $y0_{j0}$ bit of the first key subset $P_0$; establishing a pointer r to point to a $z0_{k0}$ bit of the first ciphertext subset $C_0$; and, sequentially executing encryption, including judging whether *q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first encryption step, p1 and p2 are even numbers, and r is an odd number; and, the second encryption step includes: establishing a pointer p1 to point to a $z0_{i1}$ bit of the first ciphertext subset $C_0$, and setting p1 as 8n−1 when p1 is 0; establishing a pointer p2 to point to a $z0_{i1}+1$ bit of the second key subset $P_1$, and setting p2 as 0 when p2 is 8n−1; establishing a pointer q to point to a $y1_{j1}$ bit of the second key subset $P_1$; establishing a pointer r to point to a $z1_{k1}$ bit of the second ciphertext subset $C_1$; and, sequentially executing encryption, including judging whether *q or !(*q) is true, letting *r=*p2 and letting p2, q and r to increase progressively if *q or !(*q) is true, and letting *r=*p2 and letting q and r to increase progressively and p1 to decrease progressively if *q or !(*q) is not true, wherein, in the second encryption step, p1 and p2 are even numbers, and r is an odd number.

In accordance with the method for sequentially encrypting and decrypting doubly linked lists based on double key stream ciphers, the double-key encryption methods further include: a second encryption method, including a first encryption step and a second encryption step, wherein the first encryption step includes: establishing a pointer p1 to point to an $x_{i0}$ bit of the plaintext set M, and setting p1 as 8n−1 when p1 is 0; establishing a pointer p2 to point to an $x_{i0}+1$ bit of the plaintext set M, and setting p2 as 0 when p2 is 8n−1; establishing a pointer q to point to a $y0_{j0}$ bit of the first key subset $P_0$; establishing a pointer r to point to a $z0_{k0}$ bit of the first ciphertext subset $C_0$; and, sequentially executing encryption, including judging whether *q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first encryption step, p1 and p2 are even numbers, and r is an odd number; and, the second encryption step includes: establishing a pointer p1 to point to a $z0_{i1}$ bit of the first ciphertext subset $C_0$; establishing a pointer p2 to point to a $y1_{j1}$ bit of the second key subset $P_1$; establishing a pointer r1 to point to a $z0_{k0}$ bit of the second key subset $P_1$, and setting r1 as 8n−1 when r1 is 0; establishing a pointer r2 to point to a $z1_{k1}$ bit of the first ciphertext set $C_0$, and setting r2 as 0 when r2 is 8n−1; and, sequentially executing encryption, including judging whether *q or !(*q) is true, letting *r2=*p and letting p, q and r2 to increase progressively if *q or !(*q) is true, and letting *r1=*p and letting p and q to increase progressively and r1 to decrease progressively if *q or !(*q) is not true, wherein, in the second encryption step, p is an odd number, and r1 and r2 is even numbers.

In accordance with the method for sequentially encrypting and decrypting doubly linked lists based on double key stream ciphers, the double-key encryption methods further include: a third encryption method, including a first encryption step and a second encryption step, wherein the first encryption step includes: establishing a pointer p to point to a $z0_{i1}$ bit of the first ciphertext subset $C_0$; establishing a pointer q to point to a $y1_{j1}$ bit of the second key subset $P_1$; establishing a pointer r1 to point to a $z0_{k0}$ bit of the second ciphertext subset $C_1$, and setting r1 as 8n−1 when r1 is 0; establishing a pointer r2 to point to a $z0_{k0}$+1 bit of the second ciphertext set $C_1$, and setting r2 as 0 when r2 is 8n−1; and, sequentially executing encryption, including judging whether q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first encryption step, p is an odd number, and r1 and r2 is even numbers; and, the second encryption step includes: establishing a pointer p1 to point to a $z0_{i1}$ bit of the first ciphertext set $C_1$, and setting p1 as 8n−1 when p1 is 0; establishing a pointer p2 to point to a $z0_{i1}$+1 bit of the second key set $C_1$, and setting p2 as 0 when p2 is 8n−1; establishing a pointer q to point to a $y0_{j0}$ bit of the first key subset $P_0$; establishing a pointer r to point to a $z1_{k1}$ bit of the first ciphertext subset $C_0$; and, sequentially executing encryption, including judging whether *q or !(*q) is true, letting *r=*p2 and letting p2, q and r to increase progressively if *q or !(*q) is true, and letting *r=*p2 and letting q and r to increase progressively and p1 to decrease progressively if *q or !(*q) is not true, wherein, in the second encryption step, p1 and p2 are even numbers, and r is an odd number.

In accordance with the method for sequentially encrypting and decrypting doubly linked lists based on double key stream ciphers, the double-key encryption methods further include: a fourth encryption method, including a first encryption step and a second encryption step, wherein the first encryption step includes: establishing a pointer p to point to an $x_{i0}$ bit of the plaintext set M; establishing a pointer q to point to a $y0_{j0}$ bit of the second key subset $P_0$; establishing a pointer r1 to point to a $z0_{k0}$ bit of the second ciphertext subset $C_0$, and setting r1 as 8n−1 when r1 is 0; establishing a pointer r2 to point to a $z0_{k0}$+1 bit of the second ciphertext set $C_0$, and setting r2 as 0 when r2 is 8n−1; and, sequentially executing encryption, including judging whether *q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the second encryption step, p is an odd number, and r1 and r2 is even numbers; and, the second encryption step includes: establishing a pointer p to point to a $z0_{i1}$ bit of the plaintext set $C_0$; establishing a pointer q to point to a $y1_{j1}$ bit of the second key subset $P_1$; establishing a pointer r1 to point to a $z1_{k1}$ bit of the second ciphertext subset $C_1$, and setting r1 as 8n−1 when r1 is 0; establishing a pointer r2 to point to a $z1_{k1}$+1 bit of the second ciphertext subset $C_1$, and setting r1 as 0 when r2 is 8n−1; and, sequentially executing encryption, including judging whether q or (*q) is true, letting *r=*p2 and letting p2, q and r to increase progressively if *q or !(*q) is true, and letting *r=*p2 and letting q and r to increase progressively and p1 to decrease progressively if *q or !(*q) is not true, wherein, in the second encryption step, p is an odd number, and r1 and r2 is even numbers.

In accordance with the method for sequentially encrypting and decrypting doubly linked lists based on double key stream ciphers, the method further includes decryption methods corresponding to the double-key encryption methods, wherein the decryption methods includes: retrieving initial values $i_0$, $i_1$, $j_0$, $j_1$, $k_0$ and $k_1$ for encryption; a first decryption method including a first decryption step and a second decryption step, wherein the first decryption step includes: establishing a pointer p1 to point to a $z0_{i1}$ bit of the first ciphertext set $C_0$, and setting p1 as 8n−1 when p1 is 0; establishing a pointer p2 to point to a $z0_{i1}$+1 bit of the first ciphertext set $C_0$, and setting p2 as 0 when p2 is 8n−1; establishing a pointer q to point to a $y1_{j1}$ bit of the set $P_1$; establishing a pointer r to point to a bit $z1_{k1}$ of the set $C_1$; and, sequentially executing decryption, including judging whether *q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first decryption step, p1 and p2 are even numbers, and r is an odd number; and, the second decryption step includes: establishing a pointer p1 to point to an $x_{i0}$ bit of the plaintext set M, and setting p1 as 8n−1 when p1 is 0; establishing a pointer p2 to point to an $x_{i0}$+1 bit of the plaintext set M, and setting p2 as 0 when p2 is 8n−1; establishing a pointer q to point to a $y0_{j0}$ bit of the first key subset $P_0$; establishing a pointer r to point to a $z0_{k0}$ bit of the first ciphertext subset $C_0$; and, sequentially executing encryption, including judging whether *q or (*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first encryption step, p1 and p2 are even numbers, and r is an odd number.

In accordance with the method for sequentially encrypting and decrypting doubly linked lists based on double key stream ciphers, the method further includes decryption methods corresponding to the double-key encryption methods, wherein the decryption methods includes: retrieving initial values $i_0$, $i_1$, $j_0$, $j_1$, $k_0$ and $k_1$ for decryption; a second decryption method including a first decryption step and a second decryption step, wherein the first decryption step includes: establishing a pointer p1 to point to a $z0_{i1}$ bit of the first ciphertext subset $C_0$; establishing a pointer p2 to point to a $y1_{j1}$ bit of the second key subset $P_1$; establishing a pointer r1 to point to a $z0_{k0}$ bit of the second key subset $P_1$, and setting r1 as 8n−1 when r1 is 0; establishing a pointer r2 to point to a $z1_{k1}$ bit of the first ciphertext set $C_0$, and setting r2 as 0 when r2 is 8n−1; and, sequentially executing decryption, including judging whether *q or !(*q) is true, letting *r2=*p and letting p, q and r2 to increase progressively if *q or !(*q) is true, and letting *r1=*p and letting p and q to increase progressively and r1 to decrease progressively if *q or !(*q) is not true, wherein, in the second encryption step, p is an odd number, and r1 and r2 is even numbers; and, the second decryption step includes: establishing a pointer p1 to point to an $x_{i0}$ bit of the plaintext set M, and setting p1 as 8n−1 when p1 is 0; establishing a pointer p2 to point to an $x_{i0}$+1 bit of the plaintext set M, and setting p2 as 0 when p2 is 8n−1; establishing a pointer q to point to a $y0_{j0}$ bit of the first key subset $P_0$; establishing a pointer r to point to a $z0_{k0}$ bit of the first ciphertext subset $C_0$; and, sequentially executing decryption, including judging whether *q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first decryption step, p1 and p2 are even numbers, and r is an odd number.

In accordance with the method for sequentially encrypting and decrypting doubly linked lists based on double key stream ciphers, the method further includes decryption methods corresponding to the double-key encryption methods, wherein the decryption methods includes: retrieving initial values $i_0$, $i_1$, $j_0$, $j_1$, $k_0$ and $k_1$ for decryption; a third decryption method including a first decryption step and a second decryption step, wherein the first decryption step includes: establishing a pointer p1 to point to a $z0_{i1}$ bit of the first ciphertext set $C_1$, and setting p1 as 8n−1 when p1 is 0; establishing a pointer p2 to point to a $z0_{i1}+1$ bit of the second key set $C_1$, and setting p2 as 0 when p2 is 8n−1; establishing a pointer q to point to a $y0_{j0}$ bit of the first key subset $P_0$; establishing a pointer r to point to a $z1_{k1}$ bit of the first ciphertext subset $C_0$; and, sequentially executing decryption, including judging whether *q or !(*q) is true, letting *r=*p2 and letting p2, q and r to increase progressively if *q or !(*q) is true, and letting *r=*p2 and letting q and r to increase progressively if *q or !(*q) is not true, wherein, in the second decryption step, p1 and p2 are even numbers, and r is an odd number; and, the second decryption step includes: establishing a pointer p to point to a $z0_{i1}$ bit of the first ciphertext subset $C_0$; establishing a pointer q to point to a $y1_{j1}$ bit of the second key subset $P_1$; establishing a pointer r1 to point to a $z0_{k0}$ bit of the second ciphertext subset $C_1$, and setting r1 as 8n−1 when r1 is 0; establishing a pointer r2 to point to a $z0_{k0}+1$ bit of the second ciphertext set $C_1$, and setting r2 as 0 when r2 is 8n−1; and, sequentially executing decryption, including judging whether q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first decryption step, p is an odd number, and r1 and r2 is even numbers.

In accordance with the method for sequentially encrypting and decrypting doubly linked lists based on double key stream ciphers, the method further includes decryption methods corresponding to the double-key encryption methods, wherein the decryption methods includes: retrieving initial values $i_0$, $i_1$, $j_0$, $j_1$, $k_0$ and $k_1$ for decryption; a fourth decryption method including a first decryption step and a second decryption step, wherein the first decryption step includes: establishing a pointer p to point to a $z0_{i1}$ bit of the plaintext set $C_0$; establishing a pointer q to point to a $y1_{j1}$ bit of the second key subset $P_1$; establishing a pointer r1 to point to a $z1_{k1}$ bit of the second ciphertext subset $C_1$, and setting r1 as 8n−1 when r1 is 0; establishing a pointer r2 to point to a $z1_{k1}+1$ bit of the second ciphertext set $C_1$, and setting r1 as 0 when r2 is 8n−1; and, sequentially executing decryption, including judging whether *q or !(*q) is true, letting *r=*p2 and letting p2, q and r to increase progressively if *q or !(*q) is true, and letting *r=*p2 and letting q and r to increase progressively and p1 to decrease progressively if *q or !(*q) is not true, wherein, in the second decryption step, p is an odd number, and r1 and r2 is even numbers; and, the second decryption step includes: establishing a pointer p to point to an $x_{i0}$ bit of the plaintext set M; establishing a pointer q to point to a $y0_{j0}$ bit of the second key subset $P_0$; establishing a pointer r1 to point to a $z0_{k0}$ bit of the second ciphertext subset $C_0$, and setting r1 as 8n−1 when r1 is 0; establishing a pointer r2 to point to a $z0_{k0}+1$ bit of the second ciphertext set $C_0$, and setting r2 as 0 when r2 is 8n−1; and, sequentially executing decryption, including judging whether q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first decryption step, p is an odd number, and r1 and r2 is even numbers.

In accordance with the method for sequentially encrypting and decrypting doubly linked lists based on double key stream ciphers, the algorithm set A includes at least one pair of encryption algorithm and corresponding decryption algorithm; and, the number of elements in the algorithm set A is denoted as sum(A), and sum(A) mod 2=0.

In accordance with the method for sequentially encrypting and decrypting doubly linked lists based on double key stream ciphers, a key file corresponding to the key set P includes, but not limited to: a piece of audio, a video, a picture, an image, a graph, a pseudorandom code and a chaotic value.

The disclosure has the following beneficial effects: the method is simple and it is very difficult to decipher; it is easy to implement by computer algorithms and programming; it adopt the plaintext decryption, transmission, reception, and the decryption is performed in accordance with a tree-separation principle, so that the secrecy system is securer; the decryption method is unordered decryption, rather than conventional one-to-one or one-to-multiple decryption; transmission can be performed in existing public communication channels; no any auxiliary hardware device is required; implementations are completely realized by software; and, the key bytes can be in any length, and the decryption complexity will increase with the increase of the length of the key bytes.

DETAILED DESCRIPTION OF THE DISCLOSURE

To make the objectives, technical solutions and advantages of the disclosure clearer, the disclosure will be further described below in details by specific embodiments with reference to the accompanying drawings. The method for sequentially encrypting and decrypting doubly linked lists based on double key stream ciphers in the disclosure is suitable for encryption and decryption.

Figure 1:
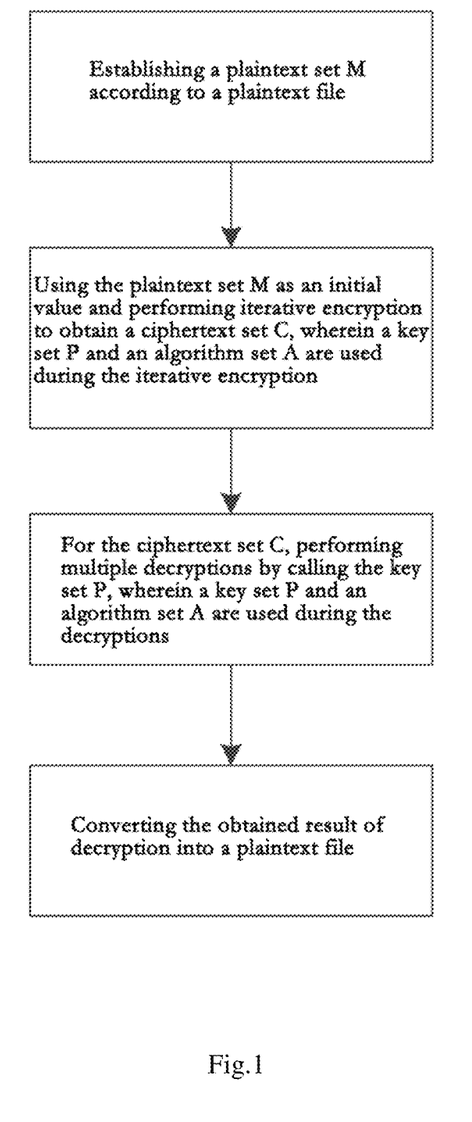
FIG. 1 shows an overall flowchart according to an embodiment of the disclosure.

FIG. 1 shows an overall flowchart according to an embodiment of the disclosure. The method specifically includes steps of: establishing a plaintext set M according to a plaintext file, wherein the plaintext can be any resolvable file; using the plaintext set M as an initial set and performing sequentially iterative encryption to obtain a ciphertext set C, wherein a reference string, a key set P and an algorithm set A are used jointly in the iterative encryption, and the reference string has $2^m$ bytes, where m>=0 and m is a positive integer; the iterative encryption includes: acquiring any values of the plaintext set M, the ciphertext set C and the key set P as initial values and pointers corresponding to the initial values, performing two iterative encryptions on the plaintext set M through the pointers, the reference string and the algorithm set A to obtain a ciphertext set C, wherein the plaintext set M and the key set P are not even numbers or odd numbers simultaneously as for a pointer used for encryption; and, for the ciphertext set C, performing multiple decryptions by calling the key set P, wherein the key set P and the algorithm set A are used during the encryption, wherein the key set P and the algorithm set A are shared by the encryption and the decryption, and the sets M and C are doubly circular linked lists, wherein the plaintext set M and the key set P are not even numbers or odd numbers simultaneously as for a pointer used for encryption; wherein the decryption includes: retrieving the iteratively encrypted initial value, establishing a pointer corresponding to the initial value, performing two decryptions on the ciphertext set C in combination with the reference string and an encryption algorithm in the algorithm set A to obtain a plaintext set M, and converting the plaintext set M into a plaintext file.

In this method, in order to realize decipherment, the following four conditions must be satisfied: 1. an algorithm program; 2. a ciphertext file (one cipher corresponding to one key); 3. a key file 1 (also referred to as a key); 4. a key file 2 (also referred to as a key). However, it is impossible to obtain the four files simultaneously. The method specifically includes definition, encryption and decryption.

The technical solutions of the disclosure further disclose the following technical features: quadruple sets of encryption system (M,C,P,A), and the sets M, C, P and A have the following characteristics.

The information {0,1} in each set is a byte character set consisting of binary code elements, which is applied to ASCII codes.

The plaintext set M has n bytes, and the number of code elements is denoted as sum(M)=8n, then sum(M) mod 8=0.

For the number of elements in the ciphertext set C, $c_1$, $c_2$, ..., $c_j$, c1, c2, c3, ..., cr are obtained by r iterations of the set M used as initial values. For a subset $c_j$ (j=1, 2, 3, ..., r), the number of code elements is denoted as sum($c_j$), then sum($c_j$) mod 8=0. If the number of bytes in the subset $c_j$ is assumed as m, then:

when m<n, it is referred to as compressed encryption;

when m=n, it is referred to as one-to-one encryption or equidensite encryption; and when m>n, it is referred to as redundant encryption.

The number of code elements in the key set P is denoted as sum(P), then sum(P) mod 8=0. If the number of bytes in the set P is assumed as m, then m≤n. The number of bytes in the set P is preliminarily defined as 1. The encryption and the decryption share the key set P. There are no codes 0x00 and 0xff in this set.

The algorithms in the algorithm set A have feasibility, definiteness, finiteness, input uniqueness and output uniqueness.

The algorithm set A is a set of computer-executable codes, also referred to as a set of functions. If the number of elements in the set A is denoted as sum(A), then sum(A) mod 2=0.

The algorithm set is characterized in that: if there is an algorithm a for encrypting $c_i$ into $c_j$, there must be an algorithm b for reverting $c_j$ to $c_i$, that is, there is an inverse algorithm or a reverting algorithm.

(2) Encryption

1. A plaintext set is set as follows:
   M={$x_0 x_1 \ldots x_{8n-1}$}, where $x_i$={0,1} and i satisfies the condition of 0≤i≤8n−1. This set is an ordered set. And n represents the number of bytes of the plaintext.
2. Key sets are set as follows:
   $P_0$={$y0_0 y0_1 \ldots y0_{8n-1}$}, where $y0_{j0}$={0,1}, j0 satisfies the condition of 0≤j0≤8n−1, and this set is an ordered set; and
   $P_1$={$y1_0 y1_1 \ldots y1_{8n-1}$}, where $y1_{j1}$={0,1}, j1 satisfies the condition of 0≤j1≤8n−1, and this set is an ordered set.
3. Ciphertext sets are set as follows:
   $C_0$={$z0_0 z0_1 \ldots z0_{8n-1}$}, where $z0_{k0}$={0,1}, k0 satisfies the condition of 0≤k0≤8n−1, and this set is an ordered set; and
   $C_1$={$z1_0 z1_1 \ldots z1_{8n-1}$}, where $z1_{k1}$={0,1}, k1 satisfies the condition of 0≤k1≤8n−1, and this set is an ordered set.
4. The set M is regarded as a circular linked list, and $x_{n-1}$ is followed by $x_0$.
5. The sets $P_0$ and $P_1$ are regarded as circular linked lists; for $P_0$, $y0_{8n-1}$ is followed by $y0_0$; and for $P_1$, $y1_{8n-1}$ is followed by $y1_0$.
6. The sets $C_0$ and $C_1$ are regarded as circular linked lists; for $C_0$, $z0_{8n-1}$ is followed by $z0_0$; and for $C_1$, $z1_{8n-1}$ is followed by $z1_0$.
7. Any initial value $i_0$ (where 0<=$i_0$<=8n−1) is used as an initial value of the set M, and this value is reserved.
   Any initial value $i_1$ (where 0<=$i_1$<=8n−1) is used as an initial value of the set $C_0$, and this value is reserved.
   Any initial value $j_0$ (where 0<=$j_0$<=8n−1) is used as an initial value of the set $P_0$, and this value is reserved.
   Any initial value $j_1$ (where 0<=$j_1$<=8n−1) is used as an initial value of the set $P_1$, and this value is reserved.
   Any initial value $k_0$ (where 0<=$k_0$<=8n−1) is used as an initial value of the set $C_0$, and this value is reserved.
   Any initial value k1 (where 0<=$k_1$<=8n−1) is used as an initial value of the set $C_1$, and this value is reserved.
   In this encryption method, there are 16 specific encryption methods, wherein there are four failed encryption methods.
8. head=0, tail=8*n−1.
9. In this encryption method, there are 16 specific encryption methods, wherein there are four failed encryption methods, and eight half-encryption methods which are equivalent to these encryption methods performed by one key, so these encryption methods are discarded. Therefore, the double-key encryption can be realized by only four encryption methods.

Figure 2:
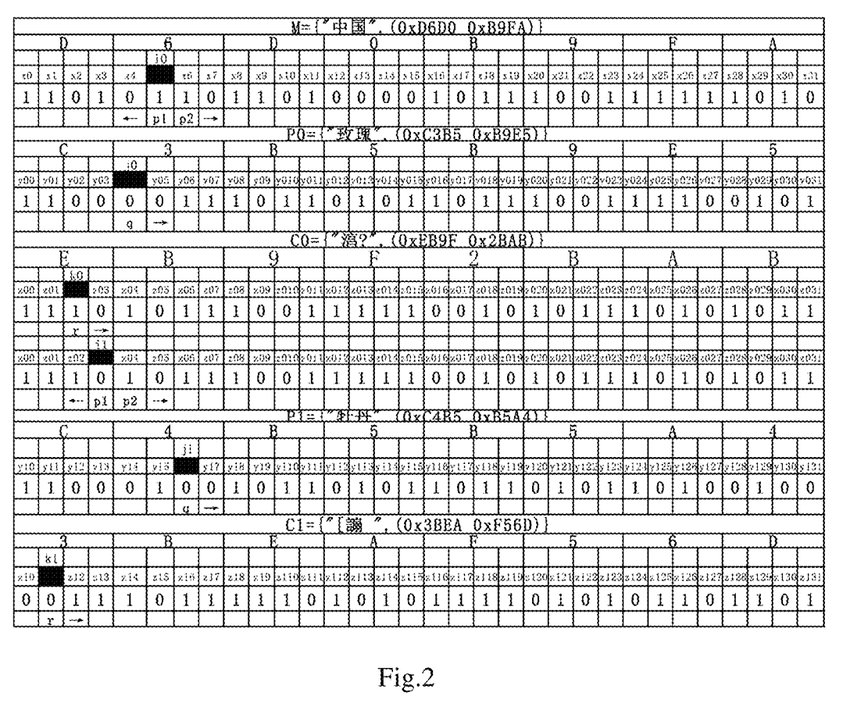
FIG. 2 shows a detail diagram of encryption and decryption in cases of "p being an even number and r being an odd number" and "p being an even number and r being an odd number" according to an embodiment of the disclosure.

FIG. 2 shows a detail diagram of encryption and decryption in cases of "p being an even number and r being an odd number" and "p being an even number and r being an odd number" according to an embodiment of the disclosure. When the value of q is "0", the value of p1 is put into r; and, when the value of q is "1", the value of p2 is put into r. Specifically as follows:

First encryption (p is an even number and r is an odd number)
1. A pointer p1 is established to point to an $x_{i0}$ bit of the set M. When p1→head, it is set that p1→tail.
2. A pointer p2 is established to point to an $x_{i0}+1$ bit of the set M. When p2→tail, it is set that p1→head.
3. A pointer q is established to point to a $y0_{j0}$ bit of the set $P_0$.
4. A pointer r is established to point to a $z0_{k0}$ bit of the set $C_0$.
5. Encryption starts. If it is determined that *q is true, *r=*p2, p2++, q++ and r++; or otherwise, *r=*p1, q++, r++ and p1--.
6. It is also possible that, if it is determined that !(*q) is true, r=*p2, p2++, q++ and r++; or otherwise, *r=*p1, q++, r++ and p1--.

Second encryption (p is an even number and r is an odd number)
1. A pointer p1 is established to point to a $z0_{i1}$ bit of the set $C_0$. When p1→head, it is set that p1→tail.
2. A pointer p2 is established to point to a $z0_{i1}+1$ bit of the set $C_0$. When p2→tail, it is set that p1→head.
3. A pointer q is established to point to a $y1_{j1}$ bit of the set $P_1$.
4. A pointer r is established to point to a $z1_{k1}$ bit of the set $C_1$.
5. Encryption starts. If it is determined that *q is true, *r=*p2, p2++, q++ and r++; or otherwise, *r=*p1, q++, r++ and p1--.
6. It is also possible that, if it is determined that !(*q) is true, *r=*p2 p2++, q++ and r++; or otherwise, *r=*p1, q++, r++ and p1--.

Decryption method 1 (p is an even number and r is an odd number, or p is an even number and r is an odd number)
The initial values $i_0$, $i_1$, $j_0$, $j_1$, $k_0$ and $k_1$ for encryption are retrieved.

First decryption (p is an even number and r is an odd number)
1. A pointer p1 is established to point to a $z0_{i1}$ bit of the set $C_0$. When p1→head, it is set that p1→tail.
2. A pointer p2 is established to point to a $z0_{i1}+1$ bit of the set $C_0$. When p2→tail, it is set that p1→head.
3. A pointer q is established to point to a $y1_{j1}$ bit of the set $P_1$.
4. A pointer r is established to point to a $z1_{k1}$ bit of the set $C_1$.
5. Encryption starts. If it is determined that *q is true, *p2=*r, p2++, q++ and r++; or otherwise, *p1=*r, q++, r++ and p1++.
6. It is also possible that, if it is determined that !(*q) is true, *p2=*r, p2++, q++ and r++; or otherwise, *p1=*r, q++, r++ and p1--.

Second decryption (p is an even number and r is an odd number)
1. A pointer p1 is established to point to an $x_{i0}$ bit of the set M. When p1→head, it is set that p1→tail.
2. A pointer p2 is established to point to an $x_{i0}+1$ bit of the set M. When p2→tail, it is set that p1→head.
3. A pointer q is established to point to a $y0_{j0}$ bit of the set $P_0$.
4. A pointer r is established to point to a $z0_{k0}$ bit of the set $C_0$.
5. Encryption starts. If it is determined that *q is true, *p2=*r, p2++, q++ and r++; or otherwise, *p1=*r, q++, r++ and p1--.
6. It is also possible that, if it is determined that !(*q) is true, *p2=*r, p2++, q++ and r++; or otherwise, *p1=*r, q++, r++ and p1--.

Figure 3:
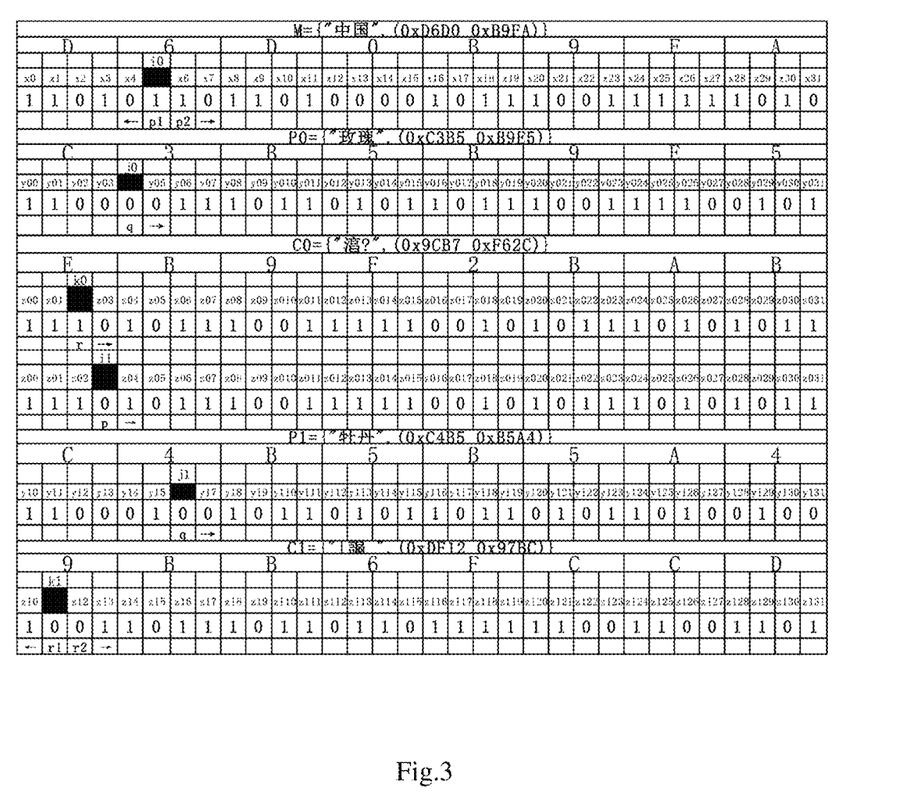
FIG. 3 shows a detail diagram of encryption and decryption in cases of "p being an even number and r being an odd number" and "p being an odd number and r being an even number" according to an embodiment of the disclosure.

FIG. 3 shows a detail diagram of encryption and decryption in cases of "p being an even number and r being an odd number" and "p being an odd number and r being an even number" according to an embodiment of the disclosure. When the value of q is "0", the value of p1 is put into r. When the value of q is "1", the value of p2 is put into r. When the value of q is "0", the value of p is put into r; and, when the value of q is "1", the value of p2 is put into r.

First encryption (p is an even number and r is an odd number)
1. A pointer p1 is established to point to an $x_{i0}$ bit of the set M. When p1→head, it is set that p1→tail.
2. A pointer p2 is established to point to an $x_{i0}+1$ bit of the set M. When p2→tail, it is set that p1→head.
3. A pointer q is established to point to a $y0_{j0}$ bit of the set $P_0$.
4. A pointer r is established to point to a $z0_{k0}$ bit of the set $C_0$.
5. Encryption starts. If it is determined *q is true, *r=*p2, p2++, q++ and r++; or otherwise, *r=*p1, q++, r++ and p1--.
6. It is also possible that, if it is determined that !(*q) is true, *r=*p2, p2++, q++ and r++; or otherwise, *r=*p1, q++, r++ and p1--.

Second encryption (p is an odd number and r is an even number)
1. A pointer p is established to point to a $z0_{i1}$ bit of the set $C_0$.
2. A pointer q is established to point to a $y1_{j1}$ bit of the set $P_1$.
3. A pointer r1 is established to point to a $z1_{k1}$ bit of the set $C_1$. When r1→head, it is set that r1→tail.
4. A pointer r2 is established to point to a $z1_{k1}+1$ bit of the set $C_1$. When r2→tail, it is set that r1→head.
5. Encryption starts. If it is determined that *q is true, *r2=*p, p++, q++ and r2++; or otherwise, *r1=*p, p++, q++ and r1--.
6. It is also possible that, if it is determined that !(*q) is true, *r2=*p, p++, q++ and r2++; or otherwise, *r1=*p, p++, q++ and r1--.

Decryption method 2 (p is an even number and r is an odd number, or p is an odd number and r is an even number)
First decryption (p is an odd number and r is an even number)
1. A pointer p is established to point to a $z0_{i1}$ bit of the set $C_0$.
2. A pointer q is established to point to a $y1_{j1}$ bit of the set $P_1$.
3. A pointer r1 is established to point to a $z1_{k1}$ bit of the set $C_1$. When r1→head, it is set that r1→tail.
4. A pointer r2 is established to point to a $z1_{k1}+1$ bit of the set $C_1$. When r2→tail, it is set that r1→head.
5. Encryption starts. If it is determined that *q is true, *p=*r2, p++, q++ and r2++; or otherwise, *p=*r1, p++, q++ and r1--.
6. It is also possible that, if it is determined that !(*q) is true, *p=*r2, p++, q++ and r2++; or otherwise, p=*r1, p++, q++ and r1--.

Second decryption (p is an even number and r is an odd number)
1. A pointer p1 is established to point to an $x_{i0}$ bit of the set M. When p1→head, it is set that p1→tail.
2. A pointer p2 is established to point to an $x_{i0}+1$ bit of the set M. When p2→tail, it is set that p1→head.

3. A pointer q is established to point to a $y0_{j0}$ bit of the set $P_0$.

4. A pointer r is established to point to a $z0_{k0}$ bit of the set $C_0$.

5. Encryption starts. If it is determined that *q is true, *p2=*r, p2++, q++ and r++; or otherwise, *p1=, q++, r++ and p1--.

6. It is also possible that, if it is determined that !(*q) is true, *p2=*r, p2++, q++ and r++; or otherwise, *p1=*r, q++, r++ and p1--.

Figure 4:
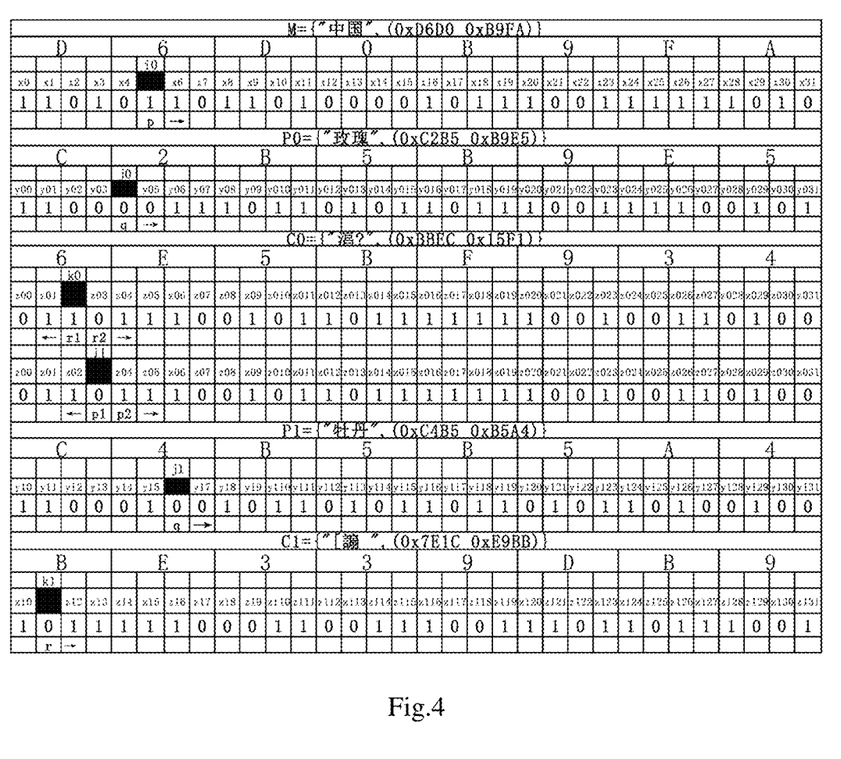
FIG. 4 shows a detail diagram of encryption and decryption in cases of "p being an odd number and r being an even number" and "p being an even number and r being an odd number" according to an embodiment of the disclosure.

FIG. 4 shows a detail diagram of encryption and decryption in cases of "p being an odd number and r being an even number" and "p being an even number and r being an odd number" according to an embodiment of the disclosure.

First encryption (p is an odd number and r is an even number)

1. A pointer p is established to point to a $z0_{i1}$ bit of the set $C_0$.

2. A pointer q is established to point to a $y1_{j1}$ bit of the set $P_1$.

3. A pointer r1 is established to point to a $z0_{k0}$ bit of the set $C_1$. When r1→head, it is set that r1→tail.

4. A pointer r2 is established to point to a $z0_{k0}+1$ bit of the set $C_1$. When r2→tail, it is set that r1→head.

5. Encryption starts. If it is determined that *q is true, *r2=*p, p++, q++ and r2++; or otherwise, *r1=*p, p++, q++ and r1--.

6. It is also possible that, if it is determined that !(*q) is true, *r2=*p, p++, q++ and r2++; or otherwise, *r1=*p, p++, q++ and r1--.

Second encryption (p is an even number and r is an odd number)

1. A pointer p1 is established to point to a $z0_{i1}$ bit of the set $C_1$. When p1→head, it is set that p1→tail.

2. A pointer p2 is established to point to a $z0_{i1}+1$ bit of the set $C_1$. When p2→tail, it is set that p1→head.

3. A pointer q is established to point to a $y0_{j0}$ bit of the set $P_0$.

4. A pointer r is established to point to a $z1_{k1}$ bit of the set $C_0$.

5. Encryption starts. If it is determined that *q is true, *r=*p2, p2++, q++ and r++; or otherwise, *r=*p1, q++, r++ and p1--.

6. It is also possible that, if it is determined that !(*q) is true, *r=*p2, p2++, q++ and r++; or otherwise, *r=*p1, q++, r++ and p1--.

Decryption method 3 (p is an odd number and r is an even number, p is an even number and r is an odd number)

First decryption (p is an even number and r is an odd number)

1. A pointer p1 is established to point to a $z0_{i1}$ bit of the set $C_1$. When p1→head, it is set that p1→tail.

2. A pointer p2 is established to point to a $z0_{i1}+1$ bit of the set $C_1$. When p2→tail, it is set that p1→head.

3. A pointer q is established to point to a $y0_{j0}$ bit of the set $P_0$.

4. A pointer r is established to point to a $z1_{k1}$ bit of the set $C_0$.

5. Encryption starts. If it is determined that *q is true, *p2=*r, p2++, q++ and r++; or otherwise, *p1=*r, q++, r++ and p1--.

6. It is also possible that, if it is determined that !(*q) is true, *p2=*r, p2++, q++ and r++; or otherwise, *p1=*r, q++, r++ and p1--.

Second decryption (p is an odd number and r is an even number)

1. A pointer p is established to point to a $z0_{i1}$ bit of the set $C_0$.

2. A pointer q is established to point to a $y1_{j1}$ bit of the set $P_1$.

3. A pointer r1 is established to point to a $z0_{k0}$ bit of the set $C_1$. When r1→head, it is set that r1→tail.

4. A pointer r2 is established to point to a $z0_{k0}+1$ bit of the set $C_1$. When r2→tail, it is set that r1→head.

5. Encryption starts. If it is determined that *q is true, *p=*r2, p++, q++ and r2++; or otherwise, *p=*r1, p++, q++ and r1--.

6. It is also possible that, if it is determined that !(*q) is true, *p=*r2, p++, q++ and r2++; or otherwise, *p=*r1, p++, q++ and r1--.

Figure 5:
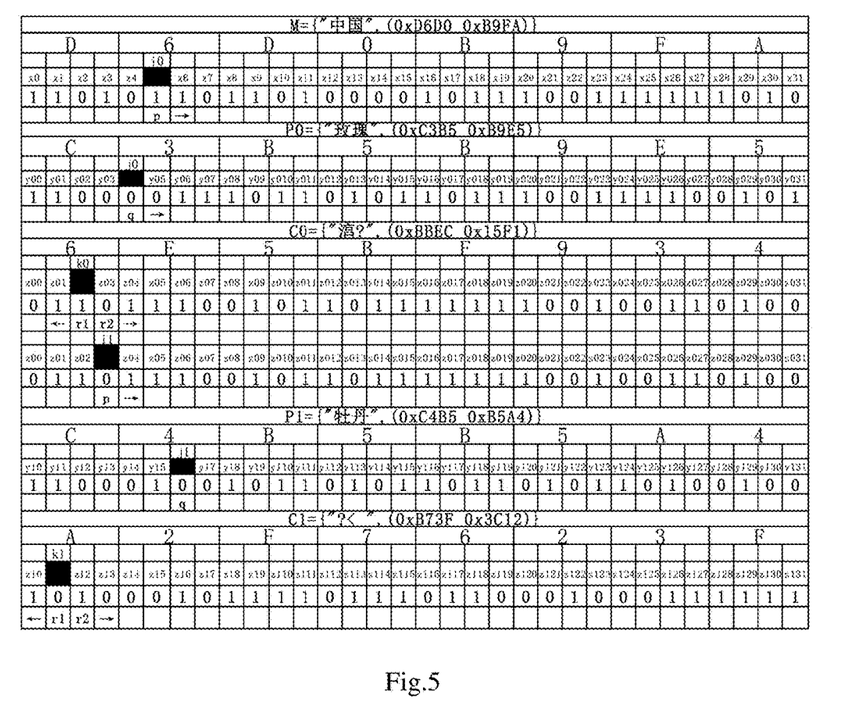
FIG. 5 shows a detail diagram of encryption and decryption in cases of "p being an odd number and r being an even number" and "p being an odd number and r being an even number" according to an embodiment of the disclosure.

FIG. 5 shows a detail diagram of encryption and decryption in cases of "p being an odd number and r being an even number" and "p being an odd number and r being an even number" according to an embodiment of the disclosure.

First encryption (p is an odd number and r is an even number)

1. A pointer p is established to point to an $x_{i0}$ bit of the set M.

2. A pointer q is established to point to a $y0_{j0}$ bit of the set $P_0$.

3. A pointer r1 is established to point to a $z0_{k0}$ bit of the set $C_0$. When r1→head, it is set that r1→tail.

4. A pointer r2 is established to point to a $z0_{k0}+1$ bit of the set $C_0$. When r2→tail, it is set that r1→head.

5. Encryption starts. If it is determined that *q is true, *r=*p2, p2++, q++ and r++; or otherwise, *r=*p1, q++, r++ and p1--.

6. It is also possible that, if it is determined that !(*q) is true, *r=*p2, p2++, q++ and r++; or otherwise, *r=*p1, q++, r++ and p1--.

Second encryption (p is an odd number and r is an even number)

1. A pointer p is established to point to a $z0_{i1}$ bit of the set $C_0$.

2. A pointer q is established to point to a $y1_{j1}$ bit of the set $P_1$.

3. A pointer r1 is established to point to a $z1_{k1}$ bit of the set $C_1$. When r1→head, it is set that r1→tail.

4. A pointer r2 is established to point to a $z1_{k1}+1$ bit of the set $C_1$. When r2→tail, it is set that r1→head.

5. Encryption starts. If it is determined that *q is true, *r=*p2, p2++, q++ and r++; or otherwise, *r=*p1, q++, r++ and p1--.

6. It is also possible that, if it is determined that !(*q) is true, *r=*p2, p2++, q++ and r++; or otherwise, *r=*p1, q++, r++ and p1--.

Decryption method 4 (p is an odd number and r is an even number, p is an odd number and r is an even number)

First decryption (p is an odd number and r is an even number)

1. A pointer p is established to point to a $z0_{i1}$ bit of the set $C_0$.

2. A pointer q is established to point to a $y1_{j1}$ bit of the set $P_1$.

3. A pointer r1 is established to point to a $z1_{k1}$ bit of the set $C_1$. When r1→head, it is set that r1→tail.

4. A pointer r2 is established to point to a $z1_{k1}+1$ bit of the set $C_1$. When r2→tail, it is set that r1→head.

5. Encryption starts. If it is determined that *q is true, *p2=*r, p2++, q++ and r++; or otherwise, *p1=*r, q++, r++ and p1--.

6. It is also possible that, if it is determined that !(*q) is true, *p2=*r, p2++, q++ and r++; or otherwise, *p1=*r, q++, r++ and p1--.

Second decryption (p is an odd number and r is an even number)

1. A pointer p is established to point to an $x_{i0}$ bit of the set M.
2. A pointer q is established to point to a $y0_{j0}$ bit of the set $P_0$.
3. A pointer r1 is established to point to a $z0_{k0}$ bit of the set $C_0$. When r1→head, it is set that r1→tail.
4. A pointer r2 is established to point to a $z0_{k0}+1$ bit of the set $C_0$. When r2→tail, it is set that r1→head.
5. Encryption starts. If it is determined that *q is true, *p2=*r, p2++, q++ and r++; or otherwise, *p1=*r, q++, r++ and p1--.
6. It is also possible that, if it is determined that !(*q) is true, *p2=*r, p2++, q++ and r++; or otherwise, *p1=*r, q++, r++ and p1--.

Compared with the prior art, this patented technology does not require any dedicated computer hardware or dedicated electronic logic device during the encryption of stream ciphers. The design of logic circuits is also not required. The feedback problems and feedback algorithms of chaotic signals are not involved. The encryption and decryption process of stream ciphers is completely solved by computer software programming. In this way, the requirements for the external conditions of the encryption and decryption of plain codes are very low. As long as there is a networked computer, encryption and decryption can be carried out. This patented technology is very high in applicability.

In this encryption technology, the longer the content of a protocol file (key) is, the more difficult the decryption is. In the existing technical specification, the length is 32 bytes. The length can also be increased to 64 bytes or 128 bytes. Or even, the length is longer.

Software products developed by this technology can be applied to the information transmission for the diplomatic department and the information transmission for the military department, and also have good effects on remote control and image transmission encryption. Due to the large difficulty of decipherment, it is almost impossible to decipher during the secrecy process of plain codes.

In the encryption process described above, only one byte is used as a reference string. Such encryption is easy to decipher. However, when the reference string has 8 bytes, 16 bytes, 32 bytes or even 64 bytes, the difficulty of decipherment can be imagined. The length of the reference string can be the same as the length of bytes of the plaintext. Even for a single byte, the difficulty of decipherment is also considerably large if multiple iterations could be performed.

Due to the development of the modern communication technology, it is no longer a problem to add a certain amount of transmission codes.

In this method, encryption is realized by double keys, and the keys can be managed by different persons, so it is ensured that the plaintext is securer.

With reference to FIGS. 2-5, detail diagrams of encryptions according to embodiments of the disclosure are shown.

Description

1. M={"中国"} represents a plaintext, i.e., a text to be encrypted. {0xD6D0 0xB9FA} is machine codes of the two Chinese characters "中国", i.e., an input sequence to be encrypted.
2. P0={"玫瑰"} represents a key. {0xC3B5 0xB9E5} is machine codes of the two Chinese characters "玫瑰".
3. P1={"牡丹"} represents another key. {0xC4B5 0xB5A4} is machine codes of the two Chinese characters "牡丹".
4. $i_0=5, i_1=3, j_0=4, j_1=6, k_0=2$ and $k_1=1$ are selected as initial values.
5. The encryption method 1 is employed, and a ciphertext C0={0x6E5B4 0Xf934} is obtained by the first encryption.
6. The encryption method 1 is employed, and a ciphertext C1={0xa2f7,0x623f} is obtained by the second encryption.

Decryption Process

Description

1. The initial values $i_0=5, i_1=3, j_0=4, j_1=6, k_0=2$ and $k_1=1$ are retrieved.
2. C1={0xa2f7,0x623f} represents a ciphertext.
3. P1={"牡丹"}={0xC4B5 0xB5A4} is machine codes of the two Chinese characters "牡丹", i.e., the second key.
4. The firstly encrypted ciphertext C0={0x6E5B, 0Xf934} is obtained by the key P1 and the decryption method 1.
5. The firstly encrypted ciphertext C0={0x6E5B, 0Xf934} is reverted by using the P0={"玫瑰"}={0xC3B5 0xB9E5} to obtain a plaintext M={"中国"}={0xD6D0 0xB9FA}.

Encryption and Decryption Algorithms

1. A plaintext file m={"中国"}={0xD6 0xD0 0xB9 0xFA}= $(1101\ 0110\ 1101\ 0000\ 1011\ 1000\ 1111\ 1010)_2$.
   A key file P0={"玫瑰"}={0xC3 0xB5 0xB9 0xE5}= $(1100\ 0011\ 1011\ 0101\ 1011\ 1000\ 1110\ 0101)_2$.
   A key file P1={"牡丹"}={0xC4 0xB5 0xB5 0xA4}= $(1100\ 0100\ 1011\ 0101\ 1011\ 0101\ 1010\ 0100)_2$.
2. A character pointer char *p_str_M is established.
   A character pointer char *p_str_P0 is established.
   A character pointer char*p_str_P1 is established.
   A character pointer char*p_str_C0 is established.
   A character pointer char*p_str_C1 is established.
3. The plaintext file M is opened, and the number of bytes in the plaintext file M is counted and stored in the n.
4. A plaintext storage space p_str_M=(char*)malloc(n*sizeof(char)) is allocated.
   A key storage space p_str_P0=(char*)malloc(n*sizeof(char)) is allocated.
   A key storage space p_str_P1=(char*)malloc(n*sizeof(char)) is allocated.
   A ciphertext storage space p_str_C0=(char*)malloc(n*sizeof(char)) is allocated.
   A ciphertext storage space p_str_C1=(char*)malloc(n*sizeof(char)) is allocated.
5. The plaintext file M is read into the space pointed by p_str_M. The p_str_M points to the first address of this space.
   The key file P0 is read into the space pointed by p_str_P0. The p_str_P0 points to the first address of this space.
   The key file P1 is read into the space pointed by p_str_P1. The p_str_P1 points to the first address of this space.
   The p_str_C0 points to the first address of the space for the firstly encrypted ciphertext.
   The p_str_C1 points to the first address of the space for the secondly encrypted ciphertext.
6. The initial value i0=5 is fetched, i.e., starting from the $(x0_5)^{th}$ bit of the space pointed by the p_str_M. This value is reserved. The reference is made to FIG. 1.

The initial value i1=3 is fetched, i.e., starting from the $(z0_3)^{th}$ bit of the space pointed by the p_str_C0. This value is reserved. The reference is made to FIG. 1.

The initial value j0=4 is fetched, i.e., starting from the $(y0_4)^{th}$ bit of the space pointed by the p_str_P0. This value is reserved. The reference is made to FIG. 1.

The initial value j1=6 is fetched, i.e., starting from the $(y1_6)^{th}$ bit of the space pointed by the p_str_P1. This value is reserved. The reference is made to FIG. 1.

The initial value k0=2 is fetched, i.e., starting from the $(z0_2)^{th}$ bit of the space pointed by the p_str_C0. This value is reserved. The reference is made to FIG. 1.

The initial value k1=1 is fetched, i.e., starting from the $(z0_2)^{th}$ bit of the space pointed by the p_str_C0. This value is reserved. The reference is made to FIG. 1.

7. The following function is established:
   int string_read_bit(char*p, int i).
   This function returns the value (0,1) of the $i^{th}$ bit of the character string pointed by the p.
8. The following function is established:
   void string_write_bit(char*p,int I,int j).
   This function writes the $i^{th}$ bit of the character string pointed by the p into the value (0,1) of j.
9. The encryption method 1 is taken as example.

```
First encryption
Variables p1 and p2 are established, where p1=i0 and p2=i0+1.
Variables q and r are established, where q=j0 and r=k0.
for(i=0;i<8*n;i++)
    {x = string_read_bit(p_str_P0,q);
    if(x)
        y = string_read_bit(p_str_M,p2);
    else
        y = string_read_bit(p_str_M,p1);
    string_write_bit(p_str_C0,r,y);
        q=q+1; if(q>8*n-1) q = 0;
        r=r+1; if(r>8*n-1) r= 0;
        p1=p1-1; if(p1 <0) p1=2*n-1;
        p2=p2+1; if(p2>8*n-1) p2=0;
    }
Second encryption
Variables p1 and p2 are established, where p1=i1 and p2=i1+1.
Variables q and r are established, where q=j1 and r=k1.
for(i=0;i<8*n;i++)
    {x = string_read_bit(p_str_P1 ,q);
    if(x)
        y = string_read_bit(p_str_C0,p2);
    else
        y = string_read_bit(p_str_C0,p1);
    string_write_bit(p_str_C1,r,y);
        q=q+1; if(q>8*n-1) q = 0;
        r=r+1; if(r>8*n-1) r=0;
        p1=p1-1; if(p1<0) p1=2*n-1;
        p2=p2+1; if(p2>8*n-1) p2=0;
    }
```

10. The p_str_C points to the first address of the allocated ciphertext storage space, and n bytes in this space are written into the ciphertext file C.
11. The ciphertext file C={"[譁]"}={0x3bea 0xf56d}=(0011 1011 1110 1010 1111 0101 0110 1101)$_2$ is obtained.
12. The above process can refer to FIG. 1.

Decryption Process

The encryption method 1 is taken as example.

```
First decryption
Variables p1 and p2 are established, where p1=i1 and p2=i1+1.
Variables q and r are established, where q=j1 and r=k1.
for (i=0;i<8*n;i++)
{x = string_read_bit(p_str_P1,q);
y = string_read_bit(p_str_C1,r);
if(x)
string_write_bit(p_str_C0,p2,y);
else
string_write_bit(p_str_C0,p1,y);
    q=q+1;if(q>8*n-1) q = 0;
    r=r+1;if(r>8*n-1) r=0;
    p1=p1-1;if(p1<0) p1=2*n-1;
    p2=p2+1;if(p2>8*n-1) p2=0;
}
Second decryption
Variables p1 and p2 are established, where p1=i0 and p2=i0+1.
Variables q and r are established, where q=j0 and r=k0.
for(i=0;i<8*n;i++)
{x = string_read_bit(p_str_P0,q);
y = string_read_bit(p_str_C0,r);
if(x)
string_write_bit(p_str_M,p2,y);
else
string_write_bit(p_str_M,p1,y);
    q=q+1;if(q>8*n-1) q=0;
    r=r+1;if(r>8*n-1) r=0;
    p1=p1-1;if(p1<0) p1=2*n-1;
    p2=p2+1;if(p2>8*n-1) p2=0;
}
Application function source program
int read_string_bit(char *p_str,int n)
{char ch0;
int i,byte,bit;
byte=n/8;bit=n%8;
for(i=0;i<byte;i++)
p_str++;
ch0=*p_str;
ch0=ch0<<bit;ch0=ch0&(0x80);
if(ch0)
return 1;
else
return 0;
}
void write_string_bit(char *p_str,int n,int boolean)
{char ch0;
int i,byte,bit;
byte=n/8; bit=n%8;
for(i=0;i<byte;i++)
p_str++;
ch0=*p_str;
switch(bit)
{ case 0:{ch0=ch0&0x7f;if(boolean)ch0=ch0|0x80;break;}
case 1:{ch0=ch0&0xbf;if(boolean)ch0=ch0|0x40;break;}
case 2:{ch0=ch0&0xdf;if(boolean)ch0=ch0|0x20;break;}
case 3:{ch0=ch0&0xef;if(boolean)ch0=ch0|0x10;break;}
case 4:{ch0=ch0&0xf7;if(boolean)ch0=ch0|0x08;break;}
case 5:{ch0=ch0&0xfb;if(boolean)ch0=ch0|0x04;break;}
case 6:{ch0=ch0&0xfd;if(boolean)ch0=ch0|0x02;break;}
case 7:{ch0=ch0&0xfe;if(boolean)ch0=ch0|0x01;break;}
}
*p_str=ch0;
}
```

Figure 6:
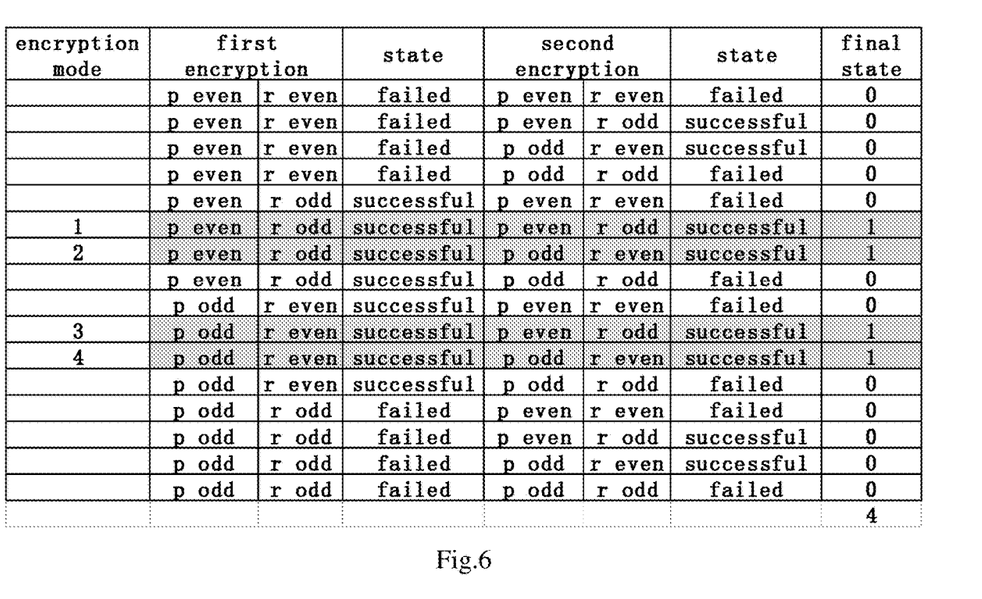
FIG. 6 shows a diagram of encryption combinations according to an embodiment of the disclosure.

FIG. 6 shows a table of encryption combinations according to an embodiment of the disclosure. The encryption step of using the plaintext set M as an initial value and performing iterative encryption to obtain a ciphertext set C includes four failed encryption methods, eight half-encryption methods and four double-key encryption methods. All the failed encryption methods and the half-encryption methods are discarded, and the four double-key encryption method are executed, wherein the four double-key encryption methods include sequentially encrypting according to a pointer of a circular linked list.

In this method, there are 16 combinations in two-encryption mode, wherein 4 combinations are encrypted successfully in both encryptions, 4 combinations fail to encrypt in both encryptions, and 8 combinations are encrypted successfully in only one of the two encryptions which are discarded due to meaninglessness for the second encryption. Only 4 combinations that are encrypted successfully in both encryptions are reported. In the final state, "1" represents successful and "0" represents failed.

The foregoing description merely shows the preferred embodiments of the disclosure, and the disclosure is not limited to the foregoing embodiments. All technical effects of the disclosure obtained by any identical means shall fall into the protection scope of the disclosure. Various different modifications and variations can be made to the technical solutions and/or embodiments within the protection scope of the disclosure.

The invention claimed is:

1. A method for sequentially encrypting and decrypting doubly linked lists based on double key stream ciphers, comprising:

establishing a plaintext set M according to a plaintext file, wherein the plaintext can be any resolvable file;

using the plaintext set M as an initial set and performing sequentially iterative encryption to obtain a ciphertext set C, wherein a reference string, a key set P and an algorithm set A are used jointly in the iterative encryption, and the reference string has $2^m$ bytes, where $m>=0$ and m is a positive integer;

the iterative encryption carried out by a network computer comprises: acquiring any values of the plaintext set M, the ciphertext set C and the key set P as initial values and pointers corresponding to the initial values, performing two iterative encryptions on the plaintext set M through the pointers, the reference string and the algorithm set A to obtain a ciphertext set C, wherein the plaintext set M and the key set P are not even numbers or odd numbers simultaneously as for a pointer used for encryption; and for the ciphertext set C, performing multiple decryptions by calling the key set P, wherein the key set P and the algorithm set A are used during the encryption, wherein the key set P and the algorithm set A are shared by the encryption and the decryption, and the sets M and C are doubly circular linked lists, wherein the plaintext set M and the key set P are not even numbers or odd numbers simultaneously as for a pointer used for encryption;

wherein the decryption carried out by a network computer comprises: retrieving the iteratively encrypted initial values, establishing pointers corresponding to the initial values, performing two decryptions on the ciphertext set C in combination with the reference string and an encryption algorithm in the algorithm set A to obtain the plaintext set M, and converting the plaintext set M into the plaintext file.

2. The method for sequentially encrypting and decrypting doubly linked lists based on double key stream ciphers according to claim 1, wherein all the plaintext set M, the ciphertext set C, the key set P and the algorithm set A are character sets consisting of binary code elements.

3. The method for sequentially encrypting and decrypting doubly linked lists based on double key stream ciphers according to claim 1, wherein establishing a plaintext set M according to a plaintext file comprises:

reading a plaintext file to obtain the number of bytes n of the plaintext file; and establishing a plaintext set M that is an ordered set, wherein $M=\{X_0X_1 \char`\^ X_{8n-1}\}$, where $x_i=\{0,1\}$ and i satisfies the condition of $0<=i<=8n-1$, and as a doubly circular linked list, for the set M, $x_{n-1}$ is followed by $x_0$.

4. The method for sequentially encrypting and decrypting doubly linked lists based on double key stream ciphers according to claim 3, wherein the method further comprises:

the key set P comprises a first key subset and a second key subset, wherein the first key subset is $P_0=\{y0_0 \ y0_1 \char`\^ y0_{8n-1}\}$, where $y0_{j0}=\{0,1\}$, j0 satisfies the condition of $0<=j0<=8n-1$, and $P_0$ is an ordered set; the second key subset is $P_1=\{y1_0y1_1, \char`\^ y1_{8n-1}\}$, where $y1_{j1}=\{0,1\}$, j1 satisfies the condition of $0<=j1<=8n-1$, and $P_1$ is an ordered set; the first key subset $P_0$ and the second key subset $P_1$ are singly circular linked lists; for $P_0$, $y0_{8n-1}$ is followed by $y0_0$; and for $P_1$, $y1_{8n-1}$ is followed by $y1_0$.

5. The method for sequentially encrypting and decrypting doubly linked lists based on double key stream ciphers according to claim 4, wherein the method further comprises:

the ciphertext set C comprises a first ciphertext subset and a second ciphertext subset, wherein the first ciphertext subset is $C_0=\{z0_0z0_1 \char`\^ z0_{8n-1}\}$, where $y0_{k0}=\{0,1\}$, k0 satisfies the condition of $0<=k0<=8n-1$, and $C_0$ is an ordered set; the second key subset is $C_1=\{z1_0z1_1 \char`\^ z1_{8n-1}\}$, where $z1_{k1}=\{0,1\}$, k1 satisfies the condition of $0<=k1<=8n-1$, and $C_1$ is an ordered set; the first key $C_0$ and the second key are doubly circular linked lists; for $C_0$, $z0_{8n-1}$ is followed by $z0_0$; and for $C_1$, $z1_{8n-1}$ is followed by $z1_0$.

6. The method for sequentially encrypting and decrypting doubly linked lists based on double key stream ciphers according to claim 5, wherein the method further comprises:

using any initial value $i_0$ (where $0<=i_0<=8n-1$) as an initial value of the set M, and reserving this initial value;

using any initial value $i_1$ (where $0<=i_1<=8n-1$) as an initial value of the set $C_0$, and reserving this initial value;

using any initial value $j_0$ (where $0<=j_0<=8n-1$) as an initial value of the set $P_0$, and reserving this initial value;

using any initial value $j_1$ (where $0<=j_1<=8n-1$) as an initial value of the set $P_1$, and reserving this initial value;

using any initial value $k_0$ (where $0<=k_0<=8n-1$) as an initial value of the set $C_0$, and reserving this initial value; and using any initial value $k_1$ (where $0<=k_1<=8n-1$) as an initial value of the set $C_1$, and reserving this initial value.

7. The method for sequentially encrypting and decrypting doubly linked lists based on double key stream ciphers according to claim 6, wherein the double-key encryption methods further comprise:

a first encryption method, comprising a first encryption step and a second encryption step, wherein the first encryption step comprises:

establishing a pointer p1 to point to an $x_{i0}$ bit of the plaintext set M, and setting p1 as 8n-1 when p1 is 0;

establishing a pointer p2 to point to an $x_{i0}+1$ bit of the plaintext set M, and setting p2 as 0 when p2 is 8n-1;

establishing a pointer q to point to a $y0_{j0}$ bit of the first key subset $P_0$;

establishing a pointer r to point to a $z0_{k0}$ bit of the first ciphertext subset $C_0$; and sequentially executing encryption, comprising judging whether *q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first encryption step, p1 and p2 are even numbers, and r is an odd number; and the second encryption step comprises:

establishing a pointer p1 to point to a $z0_{i1}$ bit of the first ciphertext subset $C_0$, and setting p1 as 8n−1 when p1 is 0;

establishing a pointer p2 to point to a $z0_{i1}+1$ bit of the second key subset $P_1$, and setting p2 as 0 when p2 is 8n−1;

establishing a pointer q to point to a $y1_{j1}$ bit of the second key subset $P_1$;

establishing a pointer r to point to a $z1_{k1}$ bit of the second ciphertext subset $C_1$; and sequentially executing encryption, comprising judging whether *q or !(*q) is true, letting *r=*p2 and letting p2, q and r to increase progressively if *q or !(*q) is true, and letting *r=*p2 and letting q and r to increase progressively and p1 to decrease progressively if *q or !(*q) is not true, wherein, in the second encryption step, p1 and p2 are even numbers, and r is an odd number.

8. The method for sequentially encrypting and decrypting doubly linked lists based on double key stream ciphers according to claim 7, further comprising decryption methods corresponding to the double-key encryption methods, wherein the decryption methods comprise:

retrieving initial values $i_0$, $i_1$, $j_0$, $j_1$, $k_0$ and $k_1$ for encryption;

a first decryption method comprising a first decryption step and a second decryption step, wherein the first decryption step comprises:

establishing a pointer p1 to point to a $z0_{i1}$ bit of the first ciphertext set $C_0$, and setting p1 as 8n−1 when p1 is 0;

establishing a pointer p2 to point to a $z0_{i1}+1$ bit of the first ciphertext set $C_0$, and setting p2 as 0 when p2 is 8n−1;

establishing a pointer q to point to a $y1_{j1}$ bit of the set $P_1$;

establishing a pointer r to point to a bit $z1_{k1}$ of the set $C_1$; and sequentially executing decryption, comprising judging whether *q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first decryption step, p1 and p2 are even numbers, and r is an odd number; and the second decryption step comprises:

establishing a pointer p1 to point to an $x_{i0}$ bit of the plaintext set M, and setting p1 as 8n−1 when p1 is 0;

establishing a pointer p2 to point to an $x_{i0}+1$ bit of the plaintext set M, and setting p2 as 0 when p2 is 8n−1;

establishing a pointer q to point to a $y0_{j0}$ bit of the first key subset $P_0$;

establishing a pointer r to point to a $z0_{k0}$ bit of the first ciphertext subset $C_0$; and sequentially executing encryption, comprising judging whether *q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first encryption step, p1 and p2 are even numbers, and r is an odd number.

9. The method for sequentially encrypting and decrypting doubly linked lists based on double key stream ciphers according to claim 6, wherein the double-key encryption methods further comprise:

a second encryption method, comprising a first encryption step and a second encryption step, wherein the first encryption step comprises:

establishing a pointer p1 to point to an $x_{i0}$ bit of the plaintext set M, and setting p1 as 8n−1 when p1 is 0;

establishing a pointer p2 to point to an $x_{i0}+1$ bit of the plaintext set M, and setting p2 as 0 when p2 is 8n−1;

establishing a pointer q to point to a $y0_{j0}$ bit of the first key subset $P_0$;

establishing a pointer r to point to a $z0_{k0}$ bit of the first ciphertext subset $C_0$; and sequentially executing encryption, comprising judging whether *q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first encryption step, p1 and p2 are even numbers, and r is an odd number; and the second encryption step comprises:

establishing a pointer p1 to point to a $z0_{i1}$ bit of the first ciphertext subset $C_0$;

establishing a pointer p2 to point to a $y1_{j1}$ bit of the second key subset $P_1$;

establishing a pointer r1 to point to a $z0_{k0}$ bit of the second key subset $P_1$, and setting r1 as 8n−1 when r1 is 0;

establishing a pointer r2 to point to a $z1_{k1}$ bit of the first ciphertext set $C_0$, and setting r2 as 0 when r2 is 8n−1; and sequentially executing encryption, comprising judging whether *q or !(*q) is true, letting *r2=*p and letting p, q and r2 to increase progressively if *q or !(*q) is true, and letting *r1=*p and letting p and q to increase progressively and r1 to decrease progressively if *q or !(*q) is not true, wherein, in the second encryption step, p is an odd number, and r1 and r2 is even numbers.

10. The method for sequentially encrypting and decrypting doubly linked lists based on double key stream ciphers according to claim 9, further comprising decryption methods corresponding to the double-key encryption methods, wherein the decryption methods comprise:

retrieving initial values $i_0$, $i_1$, $j_0$, $j_1$, $k_0$ and $k_1$ for decryption;

a second decryption method comprising a first decryption step and a second decryption step, wherein the first decryption step comprises:

establishing a pointer p1 to point to a $z0_{i1}$ bit of the first ciphertext subset $C_0$;

establishing a pointer p2 to point to a $y1_{j1}$ bit of the second key subset $P_1$;

establishing a pointer r1 to point to a $z0_{k0}$ bit of the second key subset $P_1$, and setting r1 as 8n−1 when r1 is 0;

establishing a pointer r2 to point to a $z1_{k1}$ bit of the first ciphertext set $C_0$, and setting r2 as 0 when r2 is 8n−1; and sequentially executing decryption, comprising judging whether *q or !(*q) is true, letting *r2=*p and letting p, q and r2 to increase progressively if *q or !(*q) is true, and letting *r1=*p and letting p and q to increase progressively and r1 to decrease progressively if *q or !(*q) is not true, wherein, in the second encryption step, p is an odd number, and r1 and r2 is even numbers; and the second decryption step comprises:

establishing a pointer p1 to point to an $x_{i0}$ bit of the plaintext set M, and setting p1 as 8n−1 when p1 is 0;

establishing a pointer p2 to point to an xi0+1 bit of the plaintext set M, and setting p2 as 0 when p2 is 8n−1;

establishing a pointer q to point to a $y0_{j0}$ bit of the first key subset $P_0$;

establishing a pointer r to point to a $z0_{k0}$ bit of the first ciphertext subset $C_0$; and sequentially executing decryption, comprising judging whether *q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first decryption step, p1 and p2 are even numbers, and r is an odd number.

11. The method for sequentially encrypting and decrypting doubly linked lists based on double key stream ciphers according to claim 6, wherein the double-key encryption methods further comprise:

a third encryption method, comprising a first encryption step and a second encryption step, wherein the first encryption step comprises:

establishing a pointer p to point to a $z0_{i1}$ bit of the first ciphertext subset $C_0$;

establishing a pointer q to point to a $y1_{j1}$ bit of the second key subset $P_1$;

establishing a pointer r1 to point to a $z0_{k0}$ bit of the second ciphertext subset and setting r1 as 8n−1 when r1 is 0;

establishing a pointer r2 to point to a $z0_{k0}+1$ bit of the second ciphertext set and setting r2 as 0 when r2 is 8n−1; and sequentially executing encryption, comprising judging whether *q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first encryption step, p is an odd number, and r1 and r2 is even numbers; and the second encryption step comprises:

establishing a pointer p1 to point to a $z0_{i1}$ bit of the first ciphertext set $C_1$, and setting p1 as 8n−1 when p1 is 0;

establishing a pointer p2 to point to a $z0_{i1}+1$ bit of the second key set $C_1$, and setting p2 as 0 when p2 is 8n−1;

establishing a pointer q to point to a $y0_{j0}$ bit of the first key subset $P_0$;

establishing a pointer r to point to a $z1_{k1}$ bit of the first ciphertext subset $C_0$; and sequentially executing encryption, comprising judging whether *q or !(*q) is true, letting *r=*p2 and letting p2, q and r to increase progressively if *q or !(*q) is true, and letting *r=*p2 and letting q and r to increase progressively and p1 to decrease progressively if *q or !(*q) is not true, wherein, in the second encryption step, p1 and p2 are even numbers, and r is an odd number.

12. The method for sequentially encrypting and decrypting doubly linked lists based on double key stream ciphers according to claim 11, further comprising decryption methods corresponding to the double-key decryption methods, wherein the decryption methods comprise:

retrieving initial values $i_0$, $i_1$, $j_0$, $j_1$, $k_0$ and $k_1$ for decryption;

a third decryption method comprising a first decryption step and a second decryption step, wherein the first decryption step comprises:

establishing a pointer p1 to point to a $z0_{i1}$ bit of the first ciphertext set $C_1$, and setting p1 as 8n−1 when p1 is 0;

establishing a pointer p2 to point to a $z0_{i1}+1$ bit of the second key set $C_1$, and setting p2 as 0 when p2 is 8n−1;

establishing a pointer q to point to a $y0_{j0}$ bit of the first key subset $P_0$;

establishing a pointer r to point to a $z1_{k1}$ bit of the first ciphertext subset $C_0$; and sequentially executing decryption, comprising judging whether *q or !(*q) is true, letting *r=*p2 and letting p2, q and r to increase progressively if *q or !(*q) is true, and letting *r=*p2 and letting q and r to increase progressively and p1 to decrease progressively if *q or !(*q) is not true, wherein, in the second decryption step, p1 and p2 are even numbers, and r is an odd number; and the second decryption step comprises:

establishing a pointer p to point to a $z0_{i1}$ bit of the first ciphertext subset $C_0$;

establishing a pointer q to point to a $y1_{j1}$ bit of the second key subset $P_1$;

establishing a pointer r1 to point to a $z0_{k0}$ bit of the second ciphertext subset and setting r1 as 8n−1 when r1 is 0;

establishing a pointer r2 to point to a $z0_{k0}+1$ bit of the second ciphertext set and setting r2 as 0 when r2 is 8n−1; and sequentially executing decryption, comprising judging whether *q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first decryption step, p is an odd number, and r1 and r2 is even numbers.

13. The method for sequentially encrypting and decrypting doubly linked lists based on double key stream ciphers according to claim 6, wherein the double-key encryption methods further comprise:

a fourth encryption method, comprising a first encryption step and a second encryption step, wherein the first encryption step comprises:

establishing a pointer p to point to an $x_{i0}$ bit of the plaintext set M;

establishing a pointer q to point to a $y0_{j0}$ bit of the second key subset $P_0$;

establishing a pointer r1 to point to a $z0_{k0}$ bit of the second ciphertext subset $C_0$, and setting r1 as 8n−1 when r1 is 0;

establishing a pointer r2 to point to a $z0_{k0}+1$ bit of the second ciphertext set $C_0$, and setting r2 as 0 when r2 is 8n−1; and sequentially executing encryption, comprising judging whether *q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the second encryption step, p is an odd number, and r1 and r2 is even numbers; and the second encryption step comprises:

establishing a pointer p to point to a $z0_{i1}$ bit of the plaintext set $C_0$;

establishing a pointer q to point to a $y1_{j1}$ bit of the second key subset $P_1$;

establishing a pointer r1 to point to a $z1_{k1}$ bit of the second ciphertext subset and setting r1 as 8n−1 when r1 is 0;

establishing a pointer r2 to point to a $z1_{k1}+1$ bit of the second ciphertext set and setting r1 as 0 when r2 is 8n−1; and sequentially executing encryption, comprising judging whether *q or !(*q) is true, letting *r=*p2 and letting p2, q and r to increase progressively if *q or !(*q) is true, and letting *r=*p2 and letting q and r to increase progressively and p1 to decrease progressively if *q or !(*q) is not true, wherein, in the second encryption step, p is an odd number, and r1 and r2 is even numbers.

14. The method for sequentially encrypting and decrypting doubly linked lists based on double key stream ciphers according to claim 13, further comprising decryption methods corresponding to the double-key decryption methods, wherein the decryption methods comprise:

retrieving initial values $i_0$, $i_1$, $j_0$, $j_1$, $k_0$ and $k_1$ for decryption;

a fourth decryption method comprising a first decryption step and a second decryption step, wherein the first decryption step comprises:

establishing a pointer p to point to a $z0_{i1}$ bit of the plaintext set $C_0$;

establishing a pointer q to point to a $y1_{j1}$ bit of the second key subset $P_1$;

establishing a pointer r1 to point to a $z1_{k1}$ bit of the second ciphertext subset and setting r1 as 8n−1 when r1 is 0;

establishing a pointer r2 to point to a z1k1+1 bit of the second ciphertext set and setting r1 as 0 when r2 is 8n−1; and sequentially executing decryption, comprising judging whether *q or !(*q) is true, letting *r=*p2 and letting p2, q and r to increase progressively if *q or !(*q) is true, and letting *r=*p2 and letting q and r to increase progressively and p1 to decrease progressively if *q or !(*q) is not true, wherein, in the second decryption step, p is an odd number, and r1 and r2 is even numbers; and the second decryption step comprises:

establishing a pointer p to point to an $x_{i0}$ bit of the plaintext set M;

establishing a pointer q to point to a $y0_{j0}$ bit of the second key subset $P_0$;

establishing a pointer r1 to point to a $z0_{k0}$ bit of the second ciphertext subset $C_0$, and setting r1 as 8n−1 when r1 is 0;

establishing a pointer r2 to point to a $z0_{k0}+1$ bit of the second ciphertext set $C_0$, and setting r2 as 0 when r2 is 8n−1; and sequentially executing decryption, comprising judging whether *q or !(*q) is true, letting *r=*p2 and letting p2, q and r to increase progressively if *q or !(*q) is true, and letting *r=*p1 and letting q and r to increase progressively and p1 to decrease progressively if *q or !(*q) is not true, wherein, in the first decryption step, p is an odd number, and r1 and r2 is even numbers.

15. The method for sequentially encrypting and decrypting doubly linked lists based on double key stream ciphers according to claim 1, wherein the method further comprises:

encryption step of using the plaintext set M as an initial value and performing iterative encryption to obtain a ciphertext set C comprises four failed encryption methods, eight half-encryption methods and four double-key encryption methods, all the failed encryption methods and the half-encryption methods are discarded, and the four double-key encryption method are executed, wherein the four double-key encryption methods comprise sequentially encrypting according to a pointer of a circular linked list.

16. The method for sequentially encrypting and decrypting doubly linked lists based on double key stream ciphers according to claim 1, wherein the algorithm set A comprises at least one pair of encryption algorithm and corresponding decryption algorithm; and, the number of elements in the algorithm set A is denoted as sum(A), and sum(A) mod 2=0.

17. The method for sequentially encrypting and decrypting doubly linked lists based on double key stream ciphers according to claim 1, wherein a key file corresponding to the key set P comprises, but not limited to: a piece of audio, a video, a picture, an image, a graph, a pseudorandom code and a chaotic value.

* * * * *